Sept. 15, 1964 R. E. SAYERS 3,148,623
FLOW PROPORTIONING APPARATUS FOR LIQUIDS
Filed Oct. 17, 1961

INVENTOR
ROBERT E. SAYERS
BY Reynolds + Christensen
ATTORNEYS.

United States Patent Office 3,148,623
Patented Sept. 15, 1964

3,148,623
FLOW PROPORTIONING APPARATUS
FOR LIQUIDS
Robert E. Sayers, Cheltenham, England, assignor to
Dowty Rotol Limited
Filed Oct. 17, 1961, Ser. No. 145,557
Claims priority, application Great Britain Oct. 18, 1960
8 Claims. (Cl. 103—42)

This invention relates to flow-proportioning apparatus for liquids.

According to the invention, a liquid flow-proportioning apparatus includes two or more positive displacement metering devices which are connected so that they may rotate together, each metering device having means operated by the pressure differential across the device to cause leakage of liquid from the device, so that for a given speed of rotation of the device, if the pressure differential increases or decreases, such leakage also increases or decreases substantially to maintain a constant output from the device.

The invention is particularly applicable in fuel flow-proportioning apparatus for aircraft where it is very desirable to effect proportional emptying of wing and/or fuselage fuel reservoirs in order to maintain the flying trim of the aircraft within desired limits.

Figure 1:
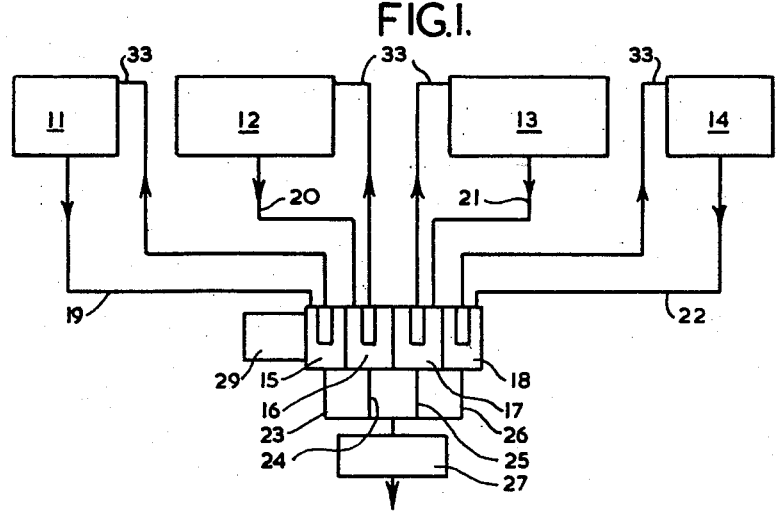
Figure 2:
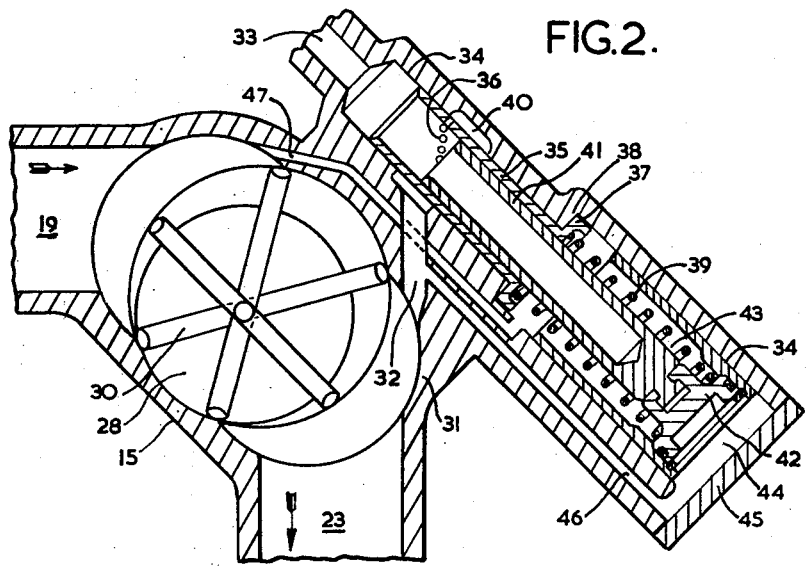

One embodiment of the invention will now be described with reference to the accompanying diagrammatic drawings, of which, FIGURE 1 is a liquid flow-proportioning apparatus for an aircraft, and FIGURE 2 shows a metering device which forms a part of the apparatus of FIGURE 1.

Referring to FIGURE 1 of the drawings, a liquid flow-proportioning apparatus for proportioning the flow of fuel from four fuel reservoirs 11, 12, 13 and 14 in an aircraft, so that proportional emptying of the reservoirs may occur, includes four positive-displacement metering devices 15, 16, 17 and 18. Two of the reservoirs 11 and 12 are disposed in one wing (not shown) of the aircraft and the other two reservoirs 13 and 14 are disposed in the other wing (not shown) of the aircraft. The metering devices 15, 16, 17 and 18 are respectively positioned in outlet pipes 19, 20, 21 and 22 from the reservoirs 11, 12, 13 and 14. The metering devices are respectively connected through pipes 23, 24, 25 and 26 to a common header 27 and thence to the fuel system of the engine (not shown) of the aircraft.

The rotors 28 of the metering devices, one of which is shown in FIGURE 2, are coupled to be rotatable together by an hydraulic driving motor 29. Each rotor is of the sliding-vane type and the width of the vanes 30 of each rotor is related to the capacity of the associated reservoir so that passage of fuel through the apparatus is such as to ensure the desired proportionality in emptying of the reservoirs.

The casing 31 of each metering device is provided with a passageway 32 which is branched from the downstream side of the rotor 28, that is the side of the rotor remote from the reservoir, and which communicates with the respective reservoir through a pipe 33. The casing 31 is provided with a bore 34 which accommodates a sleeve 35 provided with a series of ports 36 in its wall. The sleeve 35 is provided with a shoulder 37 which is held in engagement with a shoulder 38, formed in the bore 34, by a coil spring 39. Surrounding the sleeve 35 and in the vicinity of the ports 36 is an annulus 40 into which the passageway 32 opens. Supported for sliding movement within the sleeve 35 is a valve member 41 of tubular form, one end portion of this valve member co-operating with the ports 36 to control flow from the passageway 32 into the pipe 33. The other end of the valve member 41 is provided with a piston 42 which is arranged to slide in a portion of the bore 34 of increased diameter. The end of the coil spring 39 remote from the shoulder 37 engages the piston 42. A chamber 43 is thus formed between the shoulder 38 and the piston 42, while a chamber 44 is formed between the piston 42 and an end closure member 45 of the stepped bore 34. A passageway 46 is branched from the passageway 32 and communicates with the chamber 44.

A further passageway 47 is provided in the casing 31 and places the chamber 43 in communication with the inlet to the rotor 28 of the metering device.

Thus the valve formed by ports 36 and member 41 is adjustable by the piston-and-cylinder device 42, 34 to increase or decrease leakage of fuel through the passageway 32 and pipe 33 from the metering device back to the respective reservoir.

In operation of each metering device, internal and inherent leakage from one space bounded by two adjacent sliding vanes to the next such space occurs past the sides of the rotor, through the vane slots of the rotor and past the radially outer edges and sides of the vanes themselves. This inherent leakage progressively increases with increase in the pressure differential across the metering device. The characteristics of the permitted leakage past the valve at 36, 41 are so arranged that the total leakage permitted through the metering device, that is inherent and permitted leakages, is constant and related to the capacity of the metering device so that there is proportionality between the total leakages of the four metering devices in accordance with the capacities of the reservoir. However, the adjustable valve 36, 41 in each passageway 32 is so controlled by the pressure differential acting across the associated piston 42 that the valve progressively reduces the permitted leakage from the metering device whilst the inherent leakages increase, with increasing pressure differential across the metering device. Thus, for a given speed of rotation of the rotor 28, the total leakage remains constant and in proportion. The magnitude of the permitted leakage through the passageway 32 is such that the total of permitted leakage and inherent leakage for each metering device is maintained constant or substantially constant, whatever the pressure differential across the metering device in operation.

The requirement of proportionality of the total leakages of the metering devices is essential to the accurate functioning of the apparatus. In view of the constant characteristics of the total leakage for each metering device, the output of each metering device is solely dependent upon the rotational speed of the rotor 28 and, therefore, accuracy in metering and proportioning is less impaired by leakage variation than would otherwise have been the case without the trimming action of the adjustable valve 36, 41.

I claim as my invention:

1. In combination, a source of liquid; and a supply system for the liquid comprising means defining a supply conduit leading from the liquid source, a positive displacement rotary metering device connected in the conduit so as to have intake and discharge sides with respect thereto, means operative to rotate the device at a speed that is adapted to create a pressure differential between the sides thereof, means defining a leakage path which leads from the discharge side of the device, discharges outside of the system, and has a valve connected therein, said valve including a closure member which is movably mounted adjacent the leakage path so as to regulate the amount of leakage therealong, and means defining a pressure chamber which is closed to the leakage path and divided into two portions one of which is in communication with the intake side of the rotary device and the other of which is in communication with the discharge side of the device, there being a pressure responsive servo control member in the chamber which is connected with the valve closure member and responsive to increases and decreases in the pressure of the one chamber portion, relative to the other, to cause the closure member to open and close the valve, respectively, so that leakage along the path is inversely proportional to the pressure difference across the rotary device.

2. The combination according to claim 1 wherein the leakage path discharges into the liquid source.

3. The combination according to claim 1 wherein the leakage path and the chamber are interconnected by an aperture and the valve closure member is slidably engaged in the aperture so as to close off the chamber from the leakage path, there being a servo control piston connected with the closure member which is slidably engaged in the chamber so as to divide it into the two portions.

4. The combination according to claim 3 further comprising means operating to bias the piston toward a valve open opistion.

5. In combination, a pair of liquid supply tanks; and a supply system for the liquid in the tanks comprising a discharge header, means defining a supply conduit leading from each of the tanks to the header, a positive displacement rotary metering device connected in each of the conduits so as to have intake and discharge sides with respect thereto, means operative to rotate the devices together at a speed that is adapted to create a pressure differential between the sides of each device, means defining a leakage path for each device, which leads from the discharge side of such device, discharges outside of the system, and has a valve connected therein, said valve including a closure member which is movably mounted adjacent the leakage path so as to regulate the amount of leakage therealong, and means defining a pressure chamber for each leakage path, which is closed to such path and divided into two portions one of which is in communication with the intake side of its rotary device and the other of which is in communication with the discharge side of such device, there being a pressure responsive servo control member in each chamber which is connected with the valve closure member adjacent its path and responsive to increases and decreases in the pressure of the one chamber portion, relative to the other, to cause such closure member to open and close its valve, respectively, so that leakage along the path is inversely proportional to the pressure difference across its rotary device and a given discharge proportionality can be maintained between the devices.

6. The combination according to claim 5 wherein each leakage path discharges into the supply tank from which its supply conduit leads.

7. The combination according to claim 5 wherein each leakage path and its chamber are interconnected by an aperture and the valve closure member is slidably engaged in the aperture so as to close off the chamber from the leakage path, there being a servo control piston connected with the closure member which is slidably engaged in the chamber so as to divide it into the two portions.

8. The combination according to claim 7 further comprising means operating to bias the piston toward a valve open position.

References Cited in the file of this patent
UNITED STATES PATENTS

| | | |
|---|---|---|
| 2,305,519 | Dunmire | Dec. 15, 1942 |
| 2,440,371 | Holley | Apr. 27, 1948 |
| 2,665,637 | Lauck | Jan. 12, 1954 |
| 2,812,715 | Redding et al. | Nov. 12, 1957 |
| 2,924,940 | Covert et al. | Feb. 16, 1960 |
| 2,932,309 | Godden et al. | Apr. 12, 1960 |
| 2,963,219 | Palmqvist | Dec. 6, 1960 |
| 3,033,277 | Cowles et al. | May 8, 1962 |